United States Patent
Tillman

[11] Patent Number: 6,138,516
[45] Date of Patent: Oct. 31, 2000

[54] LOW-POWER SHOCK DETECTOR AND DETECTION METHOD

[75] Inventor: Jennifer C. Tillman, Friendswood, Tex.

[73] Assignee: Weld Star Technology, Inc., Orlando, Fla.

[21] Appl. No.: 08/992,615

[22] Filed: Dec. 17, 1997

[51] Int. Cl.[7] .......................... G01H 11/08; G08B 21/00; G08B 23/00
[52] U.S. Cl. .............................. 73/649; 340/429; 340/683
[58] Field of Search ..................................... 340/429, 541, 340/566, 679, 683, 691, 981; 73/659, 660, 587, 593, 649, 651, 658

[56] References Cited

U.S. PATENT DOCUMENTS

| | | |
|---|---|---|
| 3,456,134 | 7/1969 | Ko . |
| 3,643,513 | 2/1972 | Weaver ................................ 73/517 R |
| 3,979,739 | 9/1976 | Birchall ................................ 340/261 |
| 4,366,544 | 12/1982 | Shima et al. ........................... 364/550 |
| 4,470,040 | 9/1984 | Kaminishi . |
| 4,530,240 | 7/1985 | Board et al. . |
| 4,547,771 | 10/1985 | Rockwood et al. ..................... 340/683 |
| 4,690,143 | 9/1987 | Schroeppel . |
| 4,706,069 | 11/1987 | Tom et al. . |
| 4,723,447 | 2/1988 | Laing . |
| 4,756,192 | 7/1988 | Heine et al. . |
| 4,824,107 | 4/1989 | French . |
| 4,940,236 | 7/1990 | Allen . |
| 4,991,150 | 2/1991 | Wixom . |
| 5,001,466 | 3/1991 | Orlinsky . |
| 5,029,873 | 7/1991 | Davis . |
| 5,089,741 | 2/1992 | Park et al. . |
| 5,099,702 | 3/1992 | French . |
| 5,199,248 | 4/1993 | Hale et al. . |
| 5,201,292 | 4/1993 | Grajski et al. ........................... 123/425 |
| 5,280,751 | 1/1994 | Muirhead et al. . |
| 5,301,613 | 4/1994 | Muirhead . |
| 5,394,142 | 2/1995 | Dusart ................................... 340/981 |
| 5,469,952 | 11/1995 | Kershaw et al. . |
| 5,479,932 | 1/1996 | Higgins . |
| 5,500,635 | 3/1996 | Mott . |
| 5,510,666 | 4/1996 | Watanabe et al. . |
| 5,585,566 | 12/1996 | Welles, II et al. . |
| 5,600,061 | 2/1997 | Yabushita et al. ..................... 73/178 R |
| 5,612,670 | 3/1997 | Snyder et al. . |
| 5,701,257 | 12/1997 | Miura et al. ............................ 364/508 |
| 5,847,658 | 12/1998 | Irie et al. ................................ 340/683 |

*Primary Examiner*—Hezron Williams
*Assistant Examiner*—Rose M. Miller

[57] ABSTRACT

A shock detector provides for ultra low power detection and measurement of damage to an object caused by shock and vibration. The shock detector includes a shock sensor, such as an accelerometer, attached to the object that produces an electrical vibration signal representative of the mechanical vibration of the object. A signal conditioning circuit determines when the magnitude of the electrical vibration signal exceeds a threshold voltage and converts the signal into a digital signal that is in the high voltage state when the magnitude of the electrical vibration signal is above the threshold voltage. Otherwise, the digital signal is in a low voltage state. A data logger records the time spent in the high voltage state. The measured time data and the threshold voltage are then used to estimate the damage applied to the object. Mounting a number of the conditioning circuits in parallel allows for a more accurate estimation.

6 Claims, 2 Drawing Sheets

LOW-POWER SHOCK DETECTOR AND DETECTION METHOD

BACKGROUND OF THE INVENTION

Field of Invention

The present invention relates to the field of shock detectors. More specifically, the invention relates to a low-power shock detector and detection method for assessing shock damage.

Shock events may cause significant damage to equipment and structures such as stored military hardware, bridges, pipelines, tunnels, and buildings. In some structures, such as nuclear power plants and chemical plants, shock damage caused by an earthquake may cause critical damage that may lead to catastrophic consequences. Additionally, the readiness of stored military hardware has become more important as the complexity of the systems has increased because these sensitive systems must be stored for extended periods of time and yet be capable of performing when needed. However, environmental conditions such as excessive temperature and humidity and vibration of the military hardware during transport, storage, and deployment can cause deterioration and damage to the hardware.

Therefore, a method and device for assessing the energy imparted to the equipment or structure from a shock event is required so that any resulting damage may be detected, assessed, and repaired. The device must continually monitor for shock events that exceed a critical value, "critical shock events," and also assess the effects of less serious shock events for long periods without required detector maintenance. For example, sophisticated military hardware such as the Patriot missile requires continuous monitoring for periods in excess of seven years without maintenance to the detector.

Typically, the sophisticated military hardware uses mechanical critical shock indicators that, for example, use a vial that is broken or a ball held in place by springs that is displaced to indicate the magnitude of the shock event. A number of the mechanical detectors each set for different critical shock levels may be placed in series to allow detection of the magnitude of the shock. However, the mechanical indicators measure only the magnitude of the shock and do not account for the duration of the shock or extended, low-level shock events. Additionally, the mechanical indicators must be individually checked to determine whether a critical shock event has occurred.

Accordingly, a device for measuring the shock energy applied to a structure or equipment and that provides for remote monitoring of the shock is needed. Further, because equipment, such as military hardware, must be moved the monitoring device is preferably compact and mobile and is capable of operating for extended periods without maintenance. Thus, the detector preferably provides for low power consumption and includes a self contained energy source.

SUMMARY OF THE INVENTION

Accordingly, the objectives of the present invention are to provide, inter alia, a Low-Power Shock Detector and Detection Method that:

measures the shock and vibration damage applied to an object;

operates on ultra low power for extended times in excess of seven years without maintenance;

may be operated remotely without the need for hardwired connections to eternal equipment;

does not interfere with the mobility of the object;

is simple to implement and apply; and is low in cost.

Other objects of the invention will become apparent from time to time throughout the specification and claims as hereinafter related.

To achieve such improvements, the present invention generally provides an apparatus for measuring the shock and vibration damage applied to an object that requires very little power. The shock detector provides a shock sensor attached to the object that is adapted to generate an electrical vibration signal representative of the mechanical shock or vibration applied to the object. The shock detector uses a means for conditioning the electrical vibration signal to produce a high voltage state when the magnitude of the electrical vibration signal is above a threshold voltage and a low voltage state when the magnitude of the electrical vibration signal is below the threshold voltage. The shock sensor also includes means for measuring the time that the conditioned electrical vibration signal is in the high voltage state and means for storing the measured time that the conditioned electrical vibration signal is in the high voltage state. Using the time measurement data and the threshold voltage, the shock applied to the object may be estimated by multiplying the threshold voltage and the total elapsed time that the magnitude of the electrical vibration signal is above the threshold voltage.

Preferably, the shock sensor is an accelerometer adapted to generate an electrical vibration signal without requiring continuous power, such as a Polyvinyldene Flouride accelerometer or a Lead Zirconate Titanate accelerometer.

The conditioning circuit used to condition the electrical vibration signal into a digital signal preferably comprises a rectifier, a comparator, an inverter, and a potentiometer. The rectifier is connected to the shock sensor and is adapted to receive the electrical vibration signal from the shock sensor as a rectifier input signal thereto and to transmit a rectifier output signal corresponding to the absolute value of the electrical vibration signal. The comparator is connected to the rectifier and receives the rectifier output signal as a comparator input signal thereto and generates the threshold voltage and compares the comparator input signal to the threshold voltage. The comparator then transmits as a comparator output signal a low voltage state when the comparator input signal exceeds the threshold voltage and a high voltage state when the comparator input signal is equal to or less than the threshold voltage. The inverter, connected to the comparator, receives and inverts the comparator output signal so that the inverter transmits as an inverter output signal a high voltage state when the comparator input signal exceeds the threshold voltage and a low voltage state when the comparator input signal is equal to or less than the threshold voltage. Connecting a potentiometer to the comparator permits the threshold voltage to be varied.

The shock detector includes a power supply that is preferably two D cell batteries.

In an additional aspect of the invention, the shock detector includes a data logger connected to to the conditioning circuit that receives the conditioned electrical vibration signal from the conditioning circuit and stores the time measurement data. The data logger includes an event counter that is adapted to activate when the conditioned electrical vibration signal is in the high voltage state, increment as long as the conditioned electrical vibration signal is in the high voltage state, and deactivate and remain inactive while the conditioned electrical vibration signal is in the low voltage state.

A further aspect of the shock detector provides a means for determining the shock and vibration damage using the time measurement data and the threshold voltage, means for storing the resulting shock and vibration damage data, and means for displaying the resulting shock and vibration damage data. Typically, these functions are performed using a computer having a storage device and a display device, such as a monitor.

The accuracy of the shock detector is increased by using a plurality of conditioning circuits in parallel, each of the conditioning circuits having a different threshold voltage, and a means for measuring the time that the conditioned electrical vibration signal is in the high voltage state for each of the conditioning circuits. The time measurement data for each of the conditioning circuits is stored along with the associated threshold voltage associated with the measured time data. When multiple conditioning circuits are employed, the shock detector includes means for determining the shock and vibration damage using the time measurement data and the threshold voltage that integrates the incremental threshold values of the plurality of means for conditioning the electrical vibration signal and means for storing the resulting shock and vibration damage data.

BRIEF DESCRIPTION OF THE DRAWINGS

The manner in which these objectives and other desirable characteristics can be obtained is explained in the following description and attached drawings in which.

Figure 1:
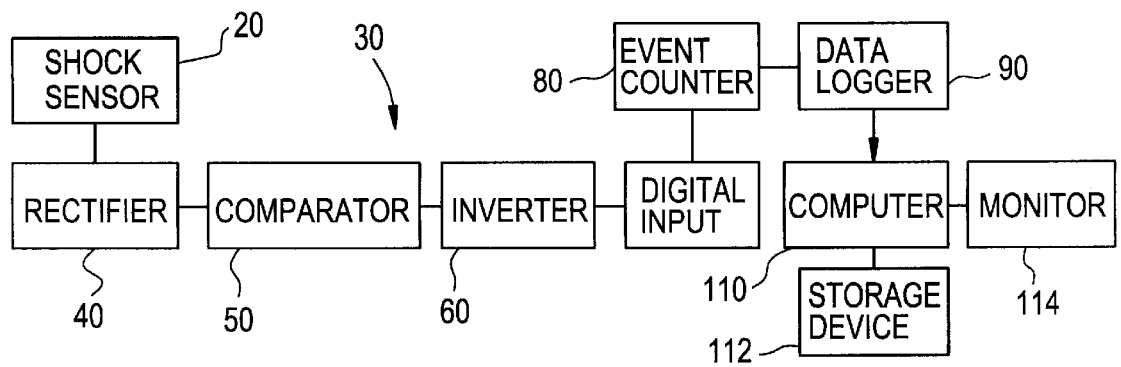
FIG. 1 is a block diagram of the shock detector showing the shock sensor, the conditioning circuit, and the data logger.

It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

The present invention generally provides an apparatus for measuring the shock and vibration damage applied to an object that requires very little power. The shock detector 10 provides a shock sensor 20 attached to the object that is adapted to generate an electrical vibration signal representative of the mechanical shock or vibration applied to the object. The shock detector 10 conditions the electrical vibration signal into a digital signal that indicates when the magnitude of the electrical vibration signal is above or below a threshold voltage and measures and records the time that the magnitude is above the threshold. Using the time measurement data and the threshold voltage, the shock applied to the object may be determined by multiplying the threshold voltage and the total elapsed time that the magnitude of the electrical vibration signal is above the threshold voltage.

The shock detector 10 is used to detect and measure the shock and vibration damage applied to an object. An object may include virtually any type of object, but refers primarily to those objects that may sustain damage when subjected to a shock or vibration and objects whose proper operation and integrity is vital. Such objects include stored military hardware which must be capable of operating after years of storage. Likewise, structures such as bridges, buildings, tunnels, pipelines, and the like are objects that may require monitoring as they may be subjected to shocks and vibrations from such events as barge impacts, earthquakes, and high wind. Vibration and shock from events such as earthquakes applied to objects such as nuclear power plants must be monitored due to the potential for the catastrophic consequences of failure.

To reduce the maintenance requirements for the shock detector 10 and to allow remote monitoring and easy application thereof, the shock detector 10 is constructed to operate on ultra low power for extended periods of time in excess of seven years. To accomplish this, each of the components of the shock detector 10 is designed to operate on very low power and to allow compact construction of the shock detector 10.

The shock sensor 20 of the shock detector 10 is adapted to detect a mechanical shock or vibration (referred to herein simply as "mechanical vibration") and generate an electrical vibration signal representative of the mechanical vibration. Preferably the shock sensor 20 is an accelerometer that is capable of generating an electrical vibration signal without requiring a continuous power such as accelerometers constructed from Polyvinyldene Flouride (PVDF) or Lead Zirconate Titanate (PZT). Thin film accelerometers constructed from these materials generate a voltage output proportional to a mechanical vibration input and do not require continuous power. Using such a shock sensor 20 helps to reduce the power required to measure the mechanical vibration and shock. The shock sensor 20 is operatively attached to the object by standard means such that shock or mechanical vibration applied to the object will be detected by the shock sensor 20.

The shock detector 10 includes means for conditioning the electrical vibration signal to produce a high voltage state when the magnitude of the electrical vibration signal is above a threshold voltage and a low voltage state when the magnitude of the electrical vibration signal is below the threshold voltage. Although the signal conditioning may be performed by a computer, the conditioning is preferably performed by a compact conditioning circuit 30 connected to the shock sensor 20. The shock detector 10 is designed to operate at a very low power so that many of the shock detectors 10 may be remotely positioned and can include a self contained power source. This overriding design consideration allows the shock detectors 10 to be positioned even on mobile objects such as stored military hardware and allows their use without requiring hard-wiring of a power source to the shock detectors 10 and without frequent repair or maintenance, such as changing the battery power source. Accordingly, the overriding considerations of ultra-low power consumption and remote, mobile operation makes continuous monitoring of the shock sensor 20 by a computer less desirable than monitoring using a compact conditioning circuit 30. Using a computer to continuously monitor the shock sensors 20 requires continuous communication between the computer and the shock sensor 20. Such communication requires either a hardwired communication link or some type of remote communication link such as RF communication. However, establishing a continuous remote continuous communication does not achieve the same ultra-low power usage as the compact conditioning circuit 30. Therefore, although the use of a computer to provide the desired signal conditioning is anticipated and considered part of the present invention, the preferred embodiment uses a conditioning circuit 30 to effect the desired signal conditioning.

Figure 2:
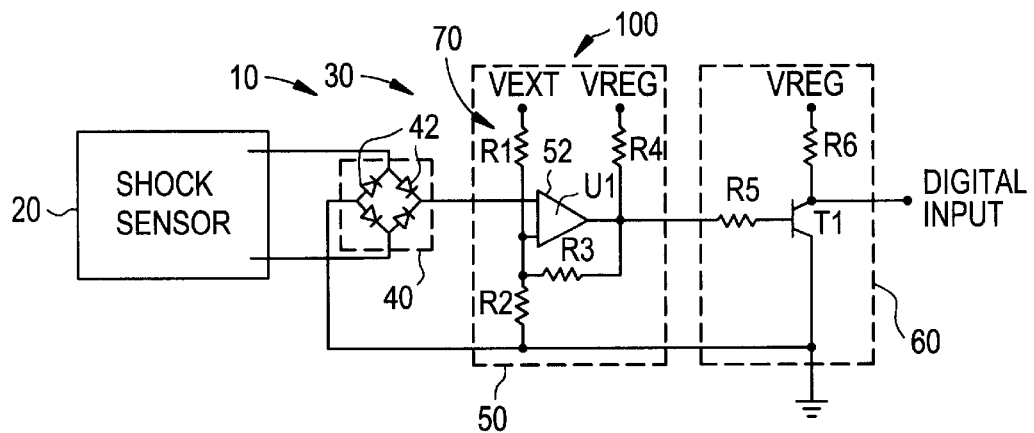
FIG. 2 is a schematic diagram of the shock sensor and conditioning circuit.

FIG. 1 is a block diagram of the shock detector 10 including the preferred conditioning circuit 30. FIG. 2 is a schematic circuit diagram of the preferred conditioning circuit 30. Although the preferred embodiment of the conditioning circuit 30 is described herein, the present application encompasses any circuitry capable of conditioning the electrical vibration signal into a digital signal that indicates when the magnitude of the electrical vibration signal is above or below a threshold voltage and measures and records the time that the magnitude is above the threshold voltage. The preferred conditioning circuit 30 is a one bit analog to digital converter that includes a rectifier 40, a comparator 50, a potentiometer 70, and an inverter 60.

The rectifier 40 is connected to the shock sensor 20 and is adapted to receive the electrical vibration signal therefrom as the rectifier input signal. The rectifier 40 conditions the signal to produce as the rectifier output signal the absolute value of the electrical vibration signal. Preferably, the rectifier 40 includes four diodes 42 arranged in a full-wave bridge pattern. A IN4007 silicone diode is suitable for use in the rectifier 40. Converting the electrical vibration signal into the absolute value facilitates analysis of the magnitude of the electrical vibration signal.

The comparator 50 is connected to the rectifier 40 and is adapted to receive the rectifier output signal as the comparator input signal. In general, the comparator 50 compares the comparator input signal to a threshold voltage and transmits, as the comparator output signal a low voltage state when the comparator input signal exceeds the threshold voltage and a high voltage state otherwise. More specifically, the comparator 50 include a pair of resistors, $R_1$ and $R_2$, that form a voltage divider circuit that produces a threshold, or reference, voltage. Preferably, the threshold voltage is adjustable which may be accomplished by incorporating a potentiometer 70 connected to the comparator 50 that is adapted to permit variation of the threshold voltage, such as by varying the resistance of resistor $R_1$. The threshold voltage established by the resistors, $R_1$ and $R_2$, is a fraction of an external voltage $V_{EXT}$ given by the ratio $R_2/(R_1+R_2)$. The threshold voltage provides one input into the comparator chip 52 which is an integrated circuit chip such as an LM311 manufactured by NATIONAL SEMICONDUCTOR. The comparator chip 52 compares the threshold voltage to the comparator input signal. A resistor $R_3$ of the comparator 50 provides positive feedback that results in the hysteresis of the comparator output signal providing noise rejection that acts as a buffer against unnecessary toggling of the output voltage state when the input "jitters." The resistor $R_3$ provides noise reduction by creating two threshold voltages. The difference between the threshold voltages is the hysteresis and equals the voltage output swing (0 to 5 volts) multiplied by the ratio between resistors $R_3$ and $R_1$. The comparator 50 acts as a switch that selectively allows an output signal therethrough that comes from an external source, the regulated voltage $V_{REG}$. The comparator 50 uses a pull-up resistor $R_4$ to drop the voltage because the comparator 50 provides a path to ground. The power supply 100 provides two separate voltage sources for supplying power to the various parts of the circuit. The power supply provides one voltage source, $V_{EXT}$, of about 7.2 volts and a second, regulated voltage source, $V_{REG}$, of about five volts.

If the comparator input signal is greater than the threshold voltage, the comparator 50 transmits as the comparator output signal a low voltage state of zero volts. Otherwise, the comparator 50 transmits as the comparator output signal a high voltage state of five volts.

The inverter 60 is connected to the comparator 50 and receives the comparator output signal as an inverter input signal. The inverter 60 is preferably an npn type transistor $T_1$ such as a MOTOROLA 2N3904 and includes a base resistor $R^5$ and a collector resistor $R_6$. The resistor values for resistors $R_5$ and $R_6$ are chosen so that the transistor saturates before the input voltage signal reaches $V_{EXT}$. The saturation voltage is dependent on the ratio between resistors $R_6$ and $R_5$. A large ratio ensures saturation. The inverter 60 inverts the inverter input signal so that it transmits as the inverter output signal a high voltage state of five volts when the comparator input signal exceeds the threshold voltage and a low voltage state of zero volts when the comparator input signal is equal to or less than the threshold voltage. Therefore, the conditioning circuit 30 produces a digital output signal to the digital input line of the data logger 90.

An event counter 80 internal to the data logger 90 serves as means for measuring the time that the conditioned electrical vibration signal is in the high voltage state. The digital input line is adapted to recognize only a low voltage state in the range of zero volts to 0.8 volts and a high voltage state in the range of two volts to five volts. As mentioned, the high voltage state transmitted as the output signal from the conditioning circuit 30 is five volts which is sufficiently greater than the required high voltage state transition voltage of two volts. Likewise, the low voltage state transmitted as the output signal from the conditioning circuit 30 is zero volts which is sufficiently less than the low voltage state transition voltage of 0.8 volts. The event counter 80 is adapted to activate and increment as long as the conditioned signal from the digital input is in the high voltage state. By counting the number of clock cycles that occur while the voltage is above the threshold value, the pulse width, or time spent in the high voltage state, is determined. The event counter 80 operates at a constant known frequency. Thus, the elapsed time between a starting point and a stopping point can be calculated. Although the raw electrical vibration signals that exceed the high voltage state transition voltage of two volts could be used to increment the event counter 80, the conditioning circuit 30 that includes the adjustable threshold voltage allows the user to specify the minimum energy level at which the counter increments.

The data logger 90 is adapted to store the time measurement data and acts as a means for storing the time that the conditioned electrical vibration signal is in the high voltage state. Many commercially available data acquisition units, or data loggers 90, are able to count pulses on digital lines while in deep sleep mode. The data logger 90 may then be preprogrammed to awake at scheduled times to analyze and record the previously acquired data. Thus, determining the time spent in the high voltage state and analyzing this data may be done at very low levels of power consumption. The data logger 90 also has the capability of performing computational analysis. For example, the data logger 90 determines whether a critical shock event has occurred. The data logger 90 performs the calculations in real time, as the event occurs. However, as the data logger 90 has limited storage and computational resources, the computations that do not require real-time analysis are preferably allocated to a remote computer 110, described below.

Once the time measurement data is collected, the shock and vibration damage may be estimated. One means for determining the shock and vibration damage using the time measurement data and the threshold voltage is to transmit the data stored in the data logger 90 to a remote computer 110 using, for example, a radio frequency transceiver utilizing a patch antenna. The computer 110 may then analyze the data and includes both a means for storing the resulting shock and vibration damage data in the form of a storage device 112, such as a hard drive, as well as a means for displaying the data in the form of a monitor 114. Any calculations not requiring real-time analysis are allocated to the computer 110, thus conserving the limited storage and computational resources of the data logger 90 and reducing the power requirements of the data logger 90.

The impulse associated with the shock event is responsible for the damage sustained to the object. The impulse transferred may be determined by calculating the area beneath the electrical vibration signal curve. The present invention estimates this value by measuring the length of each shock pulse and multiplying the length by the magnitude of the shock pulse which is estimated as the threshold voltage. For a given thin film accelerometer, the output may be described by the formula:

$$V_o = g\sigma d$$

where $V_o$ is the output voltage of the accelerometer, $\sigma$ is the applied stress, g is the piezoelectric coefficient (a material property of the accelerometer), and d is the thickness of the thin film accelerometer. The applied stress, $\sigma$, is related to the change in momentum as follows:

$$\sigma = \frac{1}{A_s} \frac{\partial p}{\partial t}$$

where the stress, $\sigma$, is the impact force divided by $A_s$, the cross sectional area of the load, and is related to the change in momentum $\partial p$ over a period of time $\partial t$. The impulse, J, may therefore be determined by the formula:

$$J = \Delta p = \frac{A_s}{gd} \int V_o \partial t$$

By determining the impulse applied to the object, the amount of damage applied thereto may also be estimated.

Figure 3:
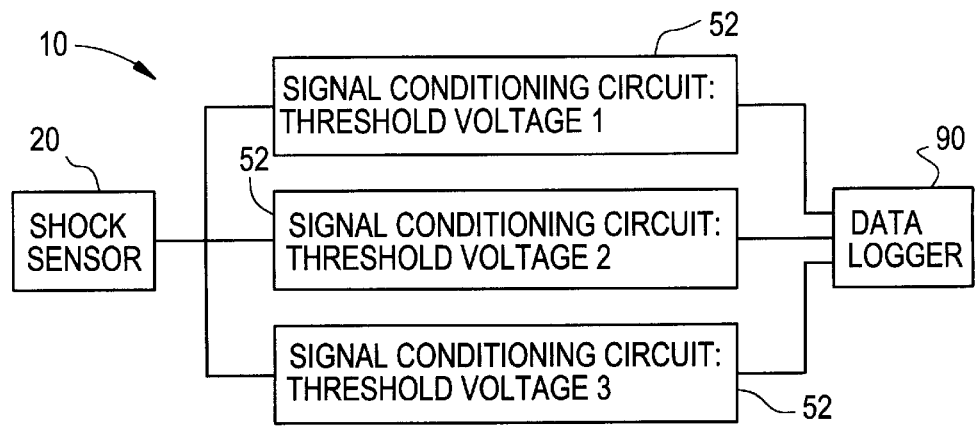
FIG. 3 is a block diagram of the shock detector employing a plurality of conditioning circuit mounted in parallel.

The estimate of the damage may be more accurately made by using a plurality of conditioning circuits 30 mounted in parallel as shown in FIG. 3. Each of the conditioning circuits 30 is set to a different, progressively higher, threshold voltage and is attached to the data logger 90 by a separate digital input line. The data logger 90 is adapted to measure the time that each of the conditioning circuits 30 transmits a high voltage state and store that data along with the associated threshold voltage data. The damage may then be determined by integrating the incremental threshold values of all of the signal conditioning circuits 30.

Figure 4:
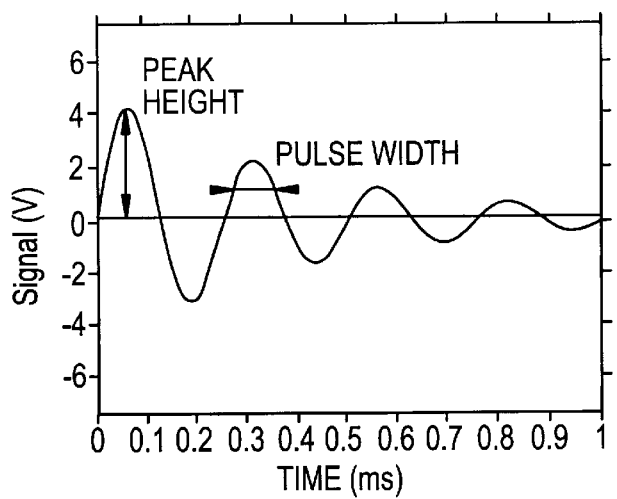
FIG. 4 is a graph showing a representative electrical vibration signal.
Figure 5:
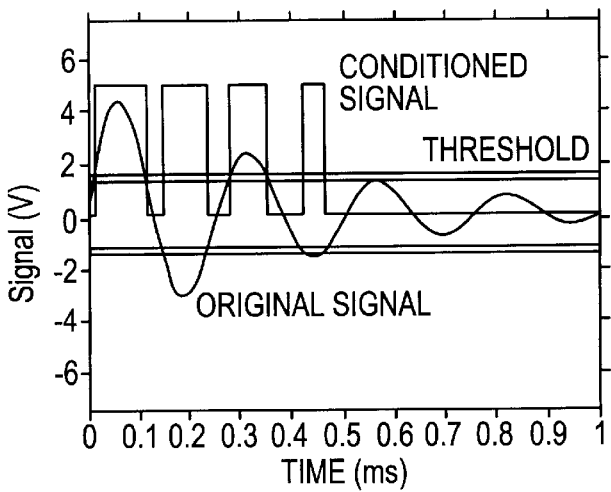
FIG. 5 is a graph comparing the representative electrical vibration signal to the conditioned, digital signal.
Figure 6:
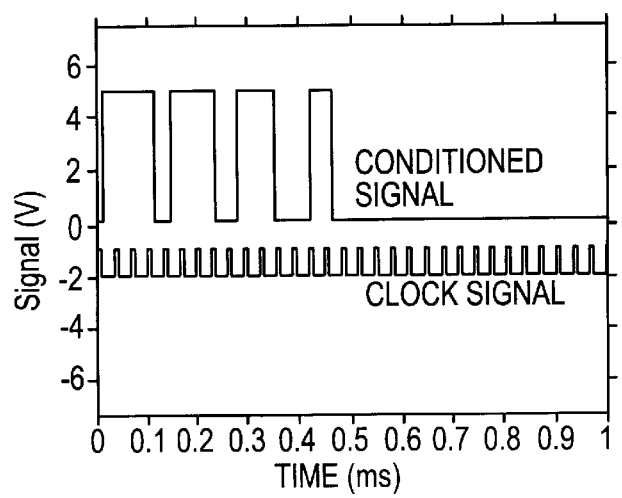
FIG. 6 is a graph showing the conditioned, digital signal and the clock signal illustrating the constant frequency of the clock signal.

FIGS. 4 through 6 show and compare the signal at various stages. FIG. 4 shows an exemplary electrical vibration signal produced by a shock event applied to an object. FIG. 5 illustrates the electrical vibration signal as compared to the output signal from the conditioning circuit 30. FIG. 5 illustrates the shift between the high voltage state and the low voltage state when the threshold voltage is crossed by the electrical vibration signal. FIG. 6 shows the conditioned signal and the event counter 80, clock signal, illustrating that the time may be measured by the constant frequency event counter 80.

The disclosed system operates at ultra low power allowing assessment of damage due to repeated shock events at current consumption values of less than 100 microamps at six volts DC. Thus, using this shock detector 10, a power supply 100 of two D cell batteries allows unattended operation of the shock detector 10 for up to ten years.

While the foregoing is directed to the preferred embodiment of the present invention, other and further embodiments of the invention may be devised without departing from the basic scope thereof and the scope thereof is determined by the claims which follow.

I claim:

1. An apparatus for detecting and measuring shock and vibration damage applied to an object comprising:

a shock sensor operatively attached to the object, the shock sensor adapted to generate an electrical vibration signal representative of a mechanical vibration applied thereto;

means for conditioning the electrical vibration signal to produce a high voltage state when the magnitude of the electrical vibration signal is above a threshold voltage and a low voltage state when the magnitude of the electrical vibration signal is below the threshold voltage;

means for measuring the time that the conditioned electrical vibration signal is in the high voltage state comprising an event counter connected to the means for conditioning the electrical vibration signal, the event counter adapted to activate when the conditioned electrical vibration signal is in the high voltage state, increment as long as the conditioned electrical vibration signal is in the high voltage state, and deactivate and remain inactive while the conditioned electrical vibration signal is in the low voltage state; and means for storing the measured time that the conditioned electrical vibration signal is in the high voltage state comprising a data loger connected to the event counter, the data logger adapted to store the time measurements.

2. The apparatus of claim 1 further comprising:

means for determining the shock and vibration damage using the time measurements and the threshold voltage; and means for storing the resulting shock and vibration damage.

3. The apparatus of claim 2 further comprising means for displaying the resulting shock and vibration damage.

4. An apparatus for detecting and measuring shock and vibration damage applied to an object comprising:

a shock sensor operatively attached to the object, the shock sensor adapted to generate an electrical vibration signal representative of a mechanical vibration applied thereto:

a plurality of means for conditioning the electrical vibration signal to produce a high voltage state when the magnitude of the electrical vibration signal is above a threshold voltage and a low voltage state when the magnitude of the electrical vibration signal is below the threshold voltage;

each of the means for conditioning the electrical vibration signal having a different threshold voltage;

means for measuring the time that the conditioned electrical vibration signal is in the high voltage state for each of the means for conditioning the electrical vibration signal;

means for storing the measured time that the conditioned electrical vibration signal is in the high voltage state for each of the means for conditioning the electrical vibration signal as well as the threshold voltage associated with the measured time that the conditioned electrical vibration signal is in the high voltage state;

means for determining the shock and vibration damage using the time measurements and the threshold voltage that integrates the incremental threshold values of the plurality of means for conditioning the electrical vibration signal; and, means for storing the resulting shock and vibration damage.

5. An apparatus for detecting and measuring shock and vibration damage applied to an object comprising:

an accelerometer operatively attached to the object, the accelerometer adapted to generate an electrical vibration signal representative of a mechanical vibration applied thereto;

the accelerometer adapted to generate an electrical vibration signal without requiring continuous power;

a rectifier connected to the accelerometer, the rectifier adapted to receive the electrical vibration signal from the accelerometer as a rectifier input signal thereto and adapted to transmit a rectifier output signal corresponding to the absolute value of the electrical vibration signal;

a comparator connected to the rectifier, the comparator adapted to receive the rectifier output signal as a comparator input signal thereto and adapted to generate the threshold voltage and compare the comparator input signal to the threshold voltage and transmit as a comparator output signal a low voltage state when the comparator input signal exceeds the threshold voltage and a high voltage state when the comparator input signal is equal to or less than the threshold voltage;

an inverter connected to the comparator, the inverter adapted to receive and invert the comparator output signal so that the inverter transmits as an inverter output signal a high voltage state when the comparator input signal exceeds the threshold voltage and a low voltage state when the comparator input signal is equal to or less than the threshold voltage;

a potentiometer connected to the comparator, the potentiometer adapted to permit the threshold voltage to be varied;

an event counter connected to the inverter, the event counter adapted to receive the inverter output signal and adapted to activate when the conditioned electrical vibration signal is in the high voltage state, increment as long as the conditioned electrical vibration signal is in the high voltage state, and deactivate and remain inactive while the conditioned electrical vibration signal is in the low voltage state;

a data logger connected to the event counter, the data logger adapted to receive and store the time measurements from the event counter;

means for determining the shock and vibration damage using the time measurements and the threshold voltage; and means for storing the resulting shock and vibration damage.

6. A method for detecting and measuring shock and vibration damage applied to an object comprising:

electrically detecting a mechanical vibration of the object and producing an electrical vibration signal representative of the mechanical vibration;

electrically conditioning the electrical vibration signal to produce a high voltage state when the electrical output signal is above a threshold voltage and a low voltage state when the electrical output signal is below the threshold voltage;

measuring the time the conditioned electrical vibration signal is in the high voltage state;

storing the measured time that the conditioned electrical vibration signal is in the high voltage state;

determining the shock and vibration damage using the time measurements and the threshold voltage; and storing the resulting shock and vibration damage.

* * * * *